United States Patent Office 3,518,312
Patented June 30, 1970

3,518,312
METHYLENE BIS(DIALKYL PHOSPHINES)
Ludwig Maier, Zurich, Switzerland, assignor to Monsanto Company, St. Louis, Mo., a corporation of Delaware
No Drawing. Filed Mar. 7, 1966, Ser. No. 532,063
Claims priority, application Switzerland, Mar. 12, 1965, 3,528/65
Int. Cl. C07f 9/50
U.S. Cl. 260—606.5      4 Claims

ABSTRACT OF THE DISCLOSURE

Tertiary diphosphines of the formula $$(R^2CH_2CH_2)_2P—R^1—P(CH_2CH_2R^2)_2$$

and method of making by reacting a diphosphine of the formula $H_2P—R^1—PH_2$ with a straight-chain, terminal double bond olefin of the formula $R^2CH=CH_2$ in the presence of a free-radical catalyst.

---

The present invention is concerned with a process for preparing tertiary diphosphines of the general formula $$(R^2CH_2CH_2)_2P—R^1—P(CH_2CH_2R^2)_2$$

wherein $R^1$ signifies a possibly halogenated alkylene, cycloalkylene, aralkylene, alkarylene or arylene group, i.e. a hydrocarbylene or halogenated hydrocarbylene group free of aliphatic unsaturation, having up to 24 carbon atoms and $R^2$ is a hydrogen atom or a non-branched alkyl group having up to 22 carbon atoms, and possibly their conversion into oxides or sulfides. The invention is also concerned with the novel tertiary diphosphines and oxide and sulfide derivatives thereof, wherein $R^2$ is a non-branched (straight-chain) alkyl group having up to 22 carbon atoms.

There have been known up to now several processes for the preparation of tertiary diphosphines which seem appropriate also for the manufacture of the diphosphines defined above. One of these known processes is based on the insertion of ethylene into tetralkylbiphosphines or tetralkylbiphosphine disulfides with subsequent desulfuration.

Whether this reaction would be practicable with higher alkyls than methyl and ethyl is not known. Methylenediphosphines and other diphosphines having longer alkylene chains than ethylene cannot be prepared by this method. The tetralkylbiphosphines serving as starting products are only obtainable by using Grignard compounds.

In another process the reaction of a dialkylhalogenophosphine with a di-lithium alkylene or phenylene or di-Grignard alkylene or phenylene, respectively, is employed. This process with alkylene derivatives is limited to those with alkylenes having more than two carbon atoms.

Another process involves the action of a dialkylphosphine upon a dialkylaminomethylene-dialkylphosphine. It permits, however, only the preparation of methylenediphosphines.

Still another process is based on the reaction of an alkali dialkylphosphide with an alkylenedihalogenide. However, it does not permit the preparation of methylenediphosphines.

Now it has been found that one obtains the diphosphine compounds defined above, when straight-chain α-olefines having up to 24 carbon atoms are brought to reaction with a diphosphine in the presence of a radical-forming catalyst according to the equation.

$$R^2CH=CH_2 + H_2P—R^1—PH_2 \rightarrow$$
$$(R^2CH_2CH_2)_2P—R^1—P(CH_2CH_2R^2)_2$$

$R^1$ and $R^2$ are defined as described hereinabove. Copending application Ser. No. 529,245, filed Feb. 23, 1966, teaches the prior art diphosphine reactants and a method for making methylene and ethylene diphosphines.

In the preparation of alkylenediphosphines according to one of the two last mentioned previously known processes, the addition of olefines to phosphine which is known, can be used for the preparation of the precursor dialkylphosphines. It turned out, however, that secondary phosphines, i.e. dialkylphosphines, are only obtainable in low yields by this process, since also primary and tertiary phosphines are simultaneously formed; whereas, the tertiary diphosphines of invention can be prepared by the analogous process in high yields.

$R^1$ groups are derived from saturated (no alpihatic unsaturation, i.e. olefinic or acetylenic) hydrocarbons having up to 24 carbon atoms. One or more of the hydrogen atoms can be replaced by halogen atoms, especially chlorine or fluorine atoms.

Examples of some simple starting products are methylenediphosphine,
chloromethylenediphosphine,
dichloromethylenediphosphine,
difluoromethylenediphosphine,
ethylene-1,2-diphosphine,
tetrafluoroethylene-1,2-diphosphine,
ethylene-1,1-diphosphine,
2,2-difluoroethylene-1,1-diphosphine,
propylene-1,3-diphosphine,
propylene-1,2-diphosphine,
isopropylenediphosphine,
butylene-1,4-diphosphine,
butylene-1,3-diphosphine,
butylene-1,2-diphosphine,
isobutylenediphosphine,
tert-butylenediphosphine,
cyclopentylene-1,3-diphosphine,
cyclopentylene-1,2-diphosphine,
cyclohexylene-1,2-diphosphine,
cyclohexylene-1,3-diphosphine,
cyclohexylene-1,4-diphosphine,
phenylene-1,2-diphosphine,
phenylene-1,3-diphosphine,
phenylene-1,4-diphosphine,
tetrafluorophenylene-1,4-diphosphine,
phenylethylene-1,2-diphosphine,
diphenylmethylenediphosphine, and
durylenediphosphine.

Especially desirable reactants are those in which $R^1$ is an alkylene group having not more than 8 carbon atoms.

As second reactants are used straight-chain olefins having a terminal double bond, i.e. vinyl derivatives of the formula $R^2CH=CH_2$, wherein $R^2$ signifies a hydrogen atoms or a non-branched alkyl having up to 22 carbon atoms; and, these olefins are obtained by, for example, distillation of monohydric fatty alcohols if necessary using of dehydrating means, decomposition of fatty acid esters or xanthates of the corresponding alcohols, or catalytic dehydrogenation of paraffins.

Some examples to be cited are: ethylene, propylene, 1-butene, 1-pentene, 1-hexene, 1-heptene, 1-octene, 1-nonene, 1-undecene, 1-dodecene, 1-tridecene, 1-tetradecene, 1-pentadecene, 1-hexadecene, 1-heptadecene, 1-octadecene, 1-nonadecene and 1-eicosane.

In carrying out the reaction a diphosphine is heated together with an olefin in the presence of a radical-forming catalyst. The reaction is normally carried out in liquid phase at temperatures of about 0–200° C. Particularly useful are catalysts, when their covalent C—C, N—N, O—O, S—S etc. bond possess a dissociation energy of about 10 to 40 kcal. Illustrative of preferred catalysts are the following main classes of compounds: azo compounds, diazo compounds, peroxides, hydroperoxides, nitroso compounds, hydrazines, azides, disulfides, hydrocarbons, organometallic compounds etc. Examples are 2,2′ - azodiisobutyronitrile, dimethylaminodiazobenzene, di-tert-butylperoxide, cumolhydroperoxide, nitrosoacetanilide, tetraphenylhydrazine, benzenesulfonylazide, diphenylsulfide, diphenyl-tetra-p-biphenylylethane, tetracyclohexyllead, dibenzylmercury etc.; moreover short wave rays such as ultra-violet rays, X-, α,β- and γ-rays, neutron rays; supersonic and the like.

The radical initiating catalysts are normally employed in amounts of about 0.5 to 10 mole percent based on the primary phosphine.

The reaction can be carried out with or without a solvent. Suitable solvents are paraffins, cycloparaffins, aromatic hydrocarbons, halogenated hydrocarbons and ethers, such as pentane, hexane, heptane, cyclohexane, benzene, toluene, xylene, tetrahydronaphthalene, decahydronaphthalene, methylenedichloride, o-dichlorobenzene, chlorinated naphthalene, diethylether, dioxane, dimethoxyethane. Water and oxygen are preferably excluded from the reaction mixture. The reaction is expediently performed in an inert atmosphere like nitrogen, or argon.

The convenient reaction temperature is directed by the decomposition temperature of the radical-forming substances. This temperature can be determined from case to case by a preliminary experiment. For example, it lies with diacylperoxides, like dibenzoylperoxides, lauroylperoxides, bis(2,4 - dichlorobenzoyl)peroxide, bis (p - chlorobenzoyl)peroxide, bis(m - nitrobenzoyl)peroxide, diacetylperoxide etc., at about 50° to 110° C.; with di-n-alkylperoxides, like dimethylperoxides, diethylperoxide, methyl-ethylperoxide etc., at about 20° to 100° C.; di-sec-alkylperoxides, like diisopropylperoxide, di-sec-amylperoxide, dicyclohexylperoxide etc., at about 50° to 130° C. and with di-tert-alkylperoxides and -hydroperoxides, like di-tert-butylperoxide, di-tert-butylhydroperoxide, di-tert-amylperoxide, di-α,α-dimethylbenzylperoxide (α-cumylperoxide), di-α,α-dimethylbenzylhydroperoxide (α-cumylhydroperoxide) etc., at about 100° to 200° C.; with ketone peroxides and ketone hydroperoxides, like hexanonehydroperoxide, methyl - propylketoneperoxide, methyl-ethylketoneperoxide, acetone peroxide, methyl-amylketoneperoxide, methyl-iso-butylketoneperoxide etc., at about 110° to 150° C. and with, for example, α,α′-azobisisobutyronitrile, at about 70° to 100° C.

Of course, the most expedient reaction temperature depends also on the kind of solvent and the reactants. The decomposition or radical formation, of the other previously enumerated catalysts is also directed by their structure. The irradiation with α- and β-particles, or with X- and γ-rays, can be carried out, as a rule, at lower temperatures than the irradiation with ultra-violet light, the reaction temperatures lying in the range of about −20° to 200° C. for the irradiation catalyzed reaction.

In general, the reaction of the diphosphine with the olefin proceeds in stoichiometric quantities, i.e. in a molar ratio of 1:4. As a practical matter an excess of olefin over the stoichiometric amount is normally used.

Since on each phosphorus atom there are found two hydrocarbon groups $R^2CH_2CH_2$, these may be different from one another. In order to reach this goal, the reaction is carried out stepwise, whereby two olefins each in a molar ratio of 1:2 are reacted.

The products resulting from the herein disclosed process are liquid or solid according to their substituents. They have utility as complexing agents, antioxidants, stabilizers and additives to rocket fuels. Moreover, they can be converted into the oxides and sulfides in a manner which is known with phosphorus compounds, and then they are valuable for the preparation of heat transfer liquids, additives to lubricants, textile agents, plasticizers, complexing agents, additives to detergent, and pesticides, such as bactericides, fungicides and insecticides.

EXAMPLE 1

A mixture of 13.5 g. of $H_2P(CH_2)_3PH_2$, 70 g. of 1-octene and 1.5 g. of α,α′-azobisisobutyronitrile is heated in a nitrogen atmosphere at 70° C. and then kept at 90° to 100° C. for 4 hours. Fractional distillation of the reaction mixture yields 60.7 g. (87%) of 1,3-propylene-bis-(dioctylphosphine); B.P. 175–180° C./0.01 mm., $n_D^{20}$ 1.4837.

On oxidation in known manner with $H_2O_2$ one obtains 1,3 - propylene - bis - (dioctylphosphine oxide); M.P. 145–150° C.

*Analysis.*—Calc'd for $C_{35}H_{74}O_2P_2$ (percent): C, 71.37; H, 12.66. Found (percent): C, 71.36; H, 12.29.

EXAMPLE 2

A mixture of 9.3 g. $H_2P(CH_2)_4PH_2$, 56.4 g. 1-dodecene and 1.5 g. of α,α′-azobisisobutyronitrile is heated as in Example 1. Fractional distillation of the reaction mixture yields 49.5 g. (81.9%) of 1,4-n-butylene-bis-(didodecylphosphine); B.P. 190–210° C./0.01 mm.

On oxidation with $H_2O_2$ one obtains 1,4-n-butylene-bis-(didodecylphosphine oxide); M.P. 65–67° C. (hydrate), 91–91.8° C. (anhydrous).

*Analysis.*—Calc'd for $C_{52}H_{108}O_2P_2$ (percent): C, 75.48; H, 13.15. Found (percent): C, 75.71; H, 12.64.

EXAMPLE 3

An autoclave is thoroughly rinsed with nitrogen and filled with 80 g. (1 mole) of $H_2PCH_2PH_2$, 140 g. (5 moles) of ethylene and 1.5 g. of α,α′-azobisisobutyronitrile. The mixture is heated at 80° C. for 3 hours. After having expanded excess ethylene one obtains almost quantitatively methylene-bis(diethylphosphine) as a colorless liquid which is strongly pyrophoric. On treating with sulfur in benzene solution one obtains quantitatively methylene-bis-(diethylphosphine sulfide); M.P. 84.5–85° C., chemical shift (in alcohol) −49.5 p.p.m.

EXAMPLE 4

A mixture of 20 g. (0.25 mole) of $H_2PCH_2PH_2$, 84 g. (1 mole) of 1-hexene and 1 g. of α,α′-azobisisobutyronitrile is heated at 70° C. for 3 hours in a nitrogen atmosphere. The resulting crude product of methylene-bis-(dihexylphosphine) is oxidized in acetone solution with a small excess of $H_2O_2$ (30% aqueous solution).

One obtains 95 g. (85%) of methylene-bis-(dihexylphosphine oxide); M.P. 34–35° C., B.P. 225–230°/0.2 mm.

The methylene-bis-(dihexylphosphine oxide) displays a strong complexing power. It is suited for the extraction of metals, e.g. uranium, from their salt solutions.

What is claimed is:

1. A tertiary diphosphine of the formula $(R^2CH_2CH_2)_2P—R^1—P(CH_2CH_2R^2)_2$ wherein $R^1$ is methylene and $R^2$ a hydrogen atom or a non-branched alkyl group having up to 22 carbon atoms.

2. A diphosphine of claim 1 wherein $R^2$ is alkyl.

3. A diphosphine of claim 1 wherein $R^2$ is a hydrogen atom.

4. A diphosphine of claim 1 wherein $R^2$ is n-butyl.

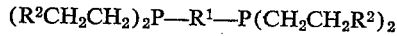
(References on following page)

References Cited

UNITED STATES PATENTS

| | | | |
|---|---|---|---|
| 2,922,819 | 1/1960 | Chatt et al. | 260—606.5 |
| 3,086,053 | 4/1963 | Wagner | 260—606.5 |
| 3,086,054 | 4/1963 | Chatt et al. | 260—606.5 |
| 3,118,951 | 1/1964 | Burg et al. | 260—606.5 |

OTHER REFERENCES

Rauhut et al., J. of Organic Chemistry, (1961), vol. 26, pp. 5138–5145, QD241J6.

Myrochek et al., J. Inorg. Nucl. Chem., (1965), vol. 27, p. 625, QD601A1J6.

Petrov et al., Zh. Obshch. Khim, (1965), vol. 35, pp. 1602–03 and 1605.

DELBERT E. GANTZ, Primary Examiner

F. W. BELLAMY, Assistant Examiner

U.S. Cl. X.R.

44—76; 204—162; 252—399, 49.8; 424—204